(12) United States Patent
Ishii

(10) Patent No.: US 7,529,099 B2
(45) Date of Patent: May 5, 2009

(54) ELECTRIC WIRE HOLDING DEVICE AND TELEVISION RECEIVER PROVIDED WITH THE SAME

(75) Inventor: Hiroki Ishii, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 16 days.

(21) Appl. No.: 11/902,196

(22) Filed: Sep. 19, 2007

(65) Prior Publication Data

US 2008/0068811 A1   Mar. 20, 2008

(30) Foreign Application Priority Data

Sep. 20, 2006   (JP) .............................. 2006-253852

(51) Int. Cl.
*H05K 7/00* (2006.01)
(52) U.S. Cl. ....................... 361/747; 361/825
(58) Field of Classification Search ................. 361/747, 361/807, 810, 852, 790, 797, 800; 439/606
See application file for complete search history.

(56) References Cited

U.S. PATENT DOCUMENTS 5,372,225 A * 12/1994 Joynes et al. ............ 191/12.2 R
6,304,428 B1 * 10/2001 Sato ............................ 361/600
6,307,752 B1 * 10/2001 Howard et al. ............... 361/752
6,985,367 B1 * 1/2006 Scigiel ......................... 361/801
7,052,305 B2 * 5/2006 Kurokawa .................... 439/371

FOREIGN PATENT DOCUMENTS

| JP | A-H07-212057 | 8/1995 |
| JP | A-H09-266386 | 10/1997 |
| JP | 3091394 | 10/2002 |
| SU | 1238275 | 6/1986 |
| SU | 1378094 | 2/1988 |

* cited by examiner

*Primary Examiner*—Hung S Bui
(74) *Attorney, Agent, or Firm*—Morgan Lewis & Bockius LLP

(57) ABSTRACT

An electric wire holding device includes a case, an electric wire insertion hole in which a case is formed, an electric wire exit hole from which the electric wire exits, an electric wire fold-back part for folding back the electric wire toward a front side and three holding shafts around which the electric wire is wound. The electric wire is wounded so as to be folded back at the electric wire fold-back part, contacted with a front side of the first holding shaft, contacted with a back side of the second holding shaft to be folded back, contacted with a front side of the third holding shaft and exited from the electric wire exit hole.

7 Claims, 3 Drawing Sheets

ELECTRIC WIRE HOLDING DEVICE AND TELEVISION RECEIVER PROVIDED WITH THE SAME

This application is based on Japanese Patent Application No. 2006-253852 filed on Sep. 20, 2006, the contents of which are hereby incorporated by reference.

BACKGROUND OF THE INVENTION

1. Field of the Invention

The present invention relates to an electric wire holding device for fixing an electric wire such as a power cord for supplying electric power, the electric wire holding device being provided in electronic devices, and a television receiver comprising the electric wire holding device.

2. Description of Related Art

In an electronic device, a cabinet is provided with an electric wire such as a power supply cord. A power supply cord is for supplying a power supply device (not shown) in a cabinet of an electronic device with electric power from the outside. FIG. 6 shows a conventional fixing structure of a power supply cord of an electronic device.

At a part of such a power supply cord 93 of an electronic device, formed is a locking part 92. Engaging the locking part 92 with an engaging part 911 of the cabinet 91 allows the power supply cord 93 to be fixedly provided. The locking part 92 is thus engaged with and fixed to the engaging part 911, so that power added to members on which the power supply cord 93 of the cabinet is mounted can be kept down (refer to Japanese Utility Model Registration No. 3091394).

Further, in an invention described in JP-A-H09-266386, disclosed is a cord holder which can prevent a power supply cord from coming out by bending a part of the power supply cord as folded back in a case. In this way, only changing a case allows the power supply cord to be fixed without any special process or additional members for the power supply cord.

Moreover, in JP-A-H07-212057, disclosed is a structure in which plural friction studs are arranged in a matrix and cables are passed between the friction studs arranged in a matrix in zigzag as engaged with them to be held.

In the case of using a power supply cord provided with a locking part, however, a power supply cord provided with a locking part should be prepared in advance. This requires labor and time in manufacturing, and thereby, causes high cost. Further, a different power supply cord should be prepared for every electronic device. This also causes high cost.

On the other hand, the power supply cord is difficult to be taken off in maintenance of the electronic device or the like and this consumes time in the case of the structure in which the power supply cord is only bent so as to be prevented from coming out, as in the invention disclosed in JP-A-H09-266386.

Furthermore, in the case of using friction studs as in the invention disclosed in JP-A-H07-212057, the cable is difficult to be taken off in maintenance of the electronic device or the like and this consumes time.

SUMMARY OF THE INVENTION

An object of the invention is to provide an electric wire holding device capable of firmly holding an electric wire such as a power supply cord without any slip and being easily detached.

Another object of the invention is to provide an electric wire holding device capable of efficiently removing transmission of force of tension to prevent damage or a break of the electric wire and a member connected to the electric wire in the electronic device from being generated even when the force of tension is added to the electric wire such as a power supply cord.

An electric wire holding device in accordance with an aspect of the invention is mounted to a cabinet of an electronic device for holding an electric wire and comprises: a case detachable to the cabinet; an electric wire insertion hole formed at an end of a front of the case for inserting the electric wire; an electric wire exit hole formed on a back side of the case for letting the electric wire exit; an electric wire fold-back part provided adjacently to the electric wire insertion hole for holding back the electric wire to the front side; and three holding shafts for winding the electric wire therearound; wherein an inverse stopper part formed so as to widen from the back side to the front side is provided in a lower surface of the case, the three holding shafts include: a first holding shaft provided on the front side of the case; a second holding shaft provided on the back side of the case; and a third holding shaft formed substantially at the middle of the first holding shaft and the second holding shaft and provided at a place closer to the electric wire exit hole than a line connecting the first holding shaft and the second holding shaft, and the electric wire is wounded so as to be folded back at the fold-back part of the electric wire, contacted with a front side of the first holding shaft, contacted with a back side of the second holding shaft to be folded back, contacted with the front side from a side opposite to the electric wire exit hole of the third holding part and exited from the electric wire exit hole.

In accordance with the structure, the force of tension transmitted to a member to which the electric wire is mounted in the cabinet can be reduced even when the force of tension is added to the electric wire.

This allows the force of tension added to the electric wire to be cut off without using a specially processed electric wire, so that the operation of the electronic device can be stabilized.

Further, the detachable structure allows the electric wire to be taken off without any damage even when the electronic device is disassembled in maintenance or the like. Accordingly, disassemble and assemble can be easily carried out. This can save labor and time, so that it is possible to reduce costs.

In a preferable aspect of the invention, the electric wire can be a power supply cord. Moreover, the electric wire holding device may be characterized in that at least one of the holding shafts has a column shape and includes plural triangle ribs projectingly provided in at equal center angle intervals on the outer circumferential part and widening from an upper part to a lower part. Furthermore, the triangle ribs may be provided four in number at equal center angle intervals on the outer circumferential part of the holding shaft.

A television receiver in accordance with another aspect of the invention includes a holding device mounted to a cabinet for holding a power supply cord and comprises: a case detachable to the cabinet and in the shape of a rectangular parallelepiped; a cord insertion hole having a protrusion formed at an end on a front surface side of a side of the case for inserting the power supply cord from a front surface of the protrusion; a cord exit hole formed on an end on the same side as the cord insertion hole in a back surface of the case for letting the power supply cord exit; a cord fold-back part provided adjacently to the cord insertion hole for folding back the power supply cord to the front side; and three holding shafts for winding the power supply cords therearound, wherein an inverse stopper part formed so as to widen from the back side to the front side is provided in a lower surface of the case; the three holding shafts includes: a first holding shaft provided on the front side of the case; a second holding shaft provided on the back side of the case; and a third holding shaft formed substantially at the middle of the first holding shaft and the second holding shaft and provided at a place closer to the cord exit hole than a line connecting the first holding shaft and the second holding shaft, each of the holding shafts including a column part projectingly provided on a bottom surface of the case and four triangle ribs projected at equal center angles from the outer circumference of the column part widening from an upper part to a lower part, the power supply cord is wounded so as to be folded back at the cord fold-back part, contacted with the front side of the first holding shaft, contacted with the back side of the second holding shaft to be folded back, contacted with the front side from a side opposite to the cord exit hole of the third holding part and exited from the cord exit hole, and the two holding shafts of the first and third holding shaft and the second and third holding shafts are provided so that the power supply cord is in contact with the triangle ribs of the respective holding shafts.

BRIEF DESCRIPTION OF THE DRAWINGS

The invention will be described with reference to the accompanying drawings, wherein like numbers refer to like elements, and wherein.

DESCRIPTION OF THE PREFERRED EMBODIMENTS

Figure 1:
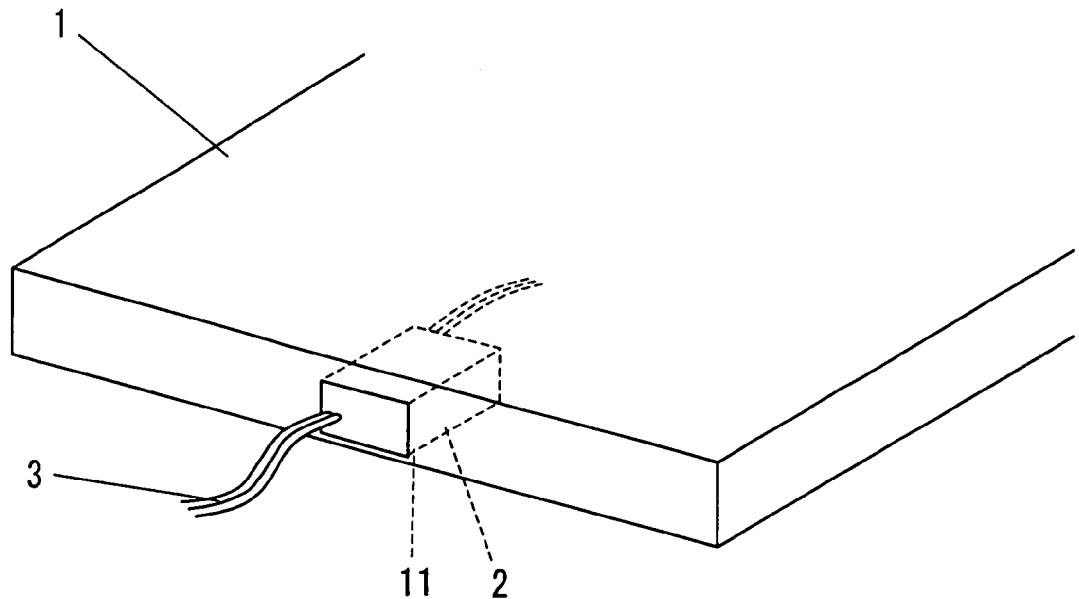
FIG. 1 is a schematically perspective view of an electric wire holding device in accordance with the invention.

Embodiments of the invention will be described hereinafter, with reference to the drawings. FIG. 1 is a schematically perspective view of an electric wire holding device in accordance with the invention. In the embodiments, exemplified is a television receiver as an electronic device provided with the electric wire holding device based on the invention.

As shown in FIG. 1, a television receiver comprises a cabinet 1. The cabinet 1 forms a part of an exterior member for three-dimensionally arranging respective components such as a component related to the television receiver. The cabinet 1 is formed from resin here but not limited to the same. A detachably formed electric wire holding device 2 and a power supply cord 3 mounted to the electric wire holding device 2 are mounted to the cabinet 1.

Figure 2:
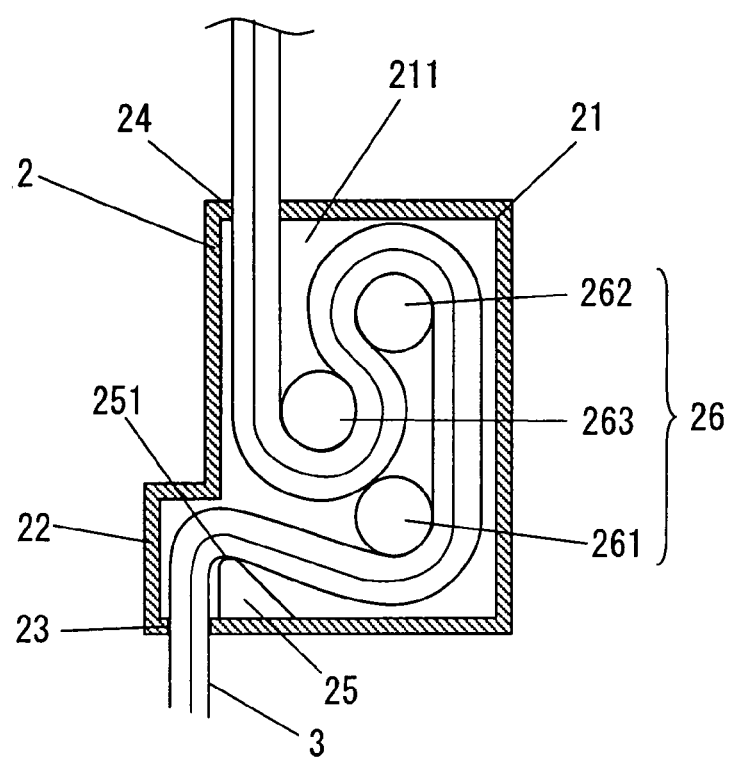
FIG. 2 is a flat sectional view of an electric wire holding device in accordance with the invention.
Figure 3:
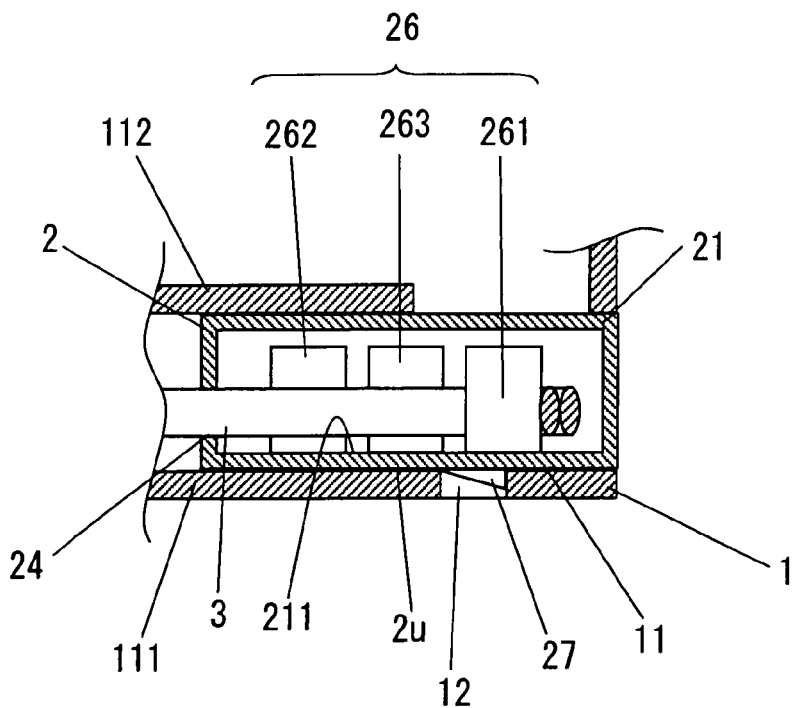
FIG. 3 is a side sectional view of the electric wire holding device shown in FIG. 2.

FIG. 2 is a flat sectional view of an electric wire holding device in accordance with the invention. FIG. 3 is a side sectional view of the electric wire holding device shown in FIG. 2. As shown in FIG. 2, the electric wire holding device 2 comprises a case 21, a protrusion 22 projected from a front side of a side of the case 21, an electric wire insertion hole 23 for inserting the power supply cord 3 in a front surface of the protrusion 22, an electric wire exit hole 24, which is formed on a back surface and from which the power supply cord 3 exits, an electric wire fold-back part 25 provided adjacently to the electric wire insertion hole 23 and three holding shafts 26 around which the power supply cord 3 is wound.

The case 21 is substantially in the shape of a rectangular parallelepiped. The protrusion 22 is formed into one body with the case 21. The case 21 and the protrusion 22 are formed from a material same as that of the cabinet 1, resin here, but not limited to the same. The electric wire holding device 2 is pushed from the front side to the back side to be mounted to the cabinet 1, as shown in FIG. 3. A mounting part 11 into which the electric wire holding device 2 is inserted is formed in the cabinet 1. The mounting part 11 has a lower surface holding part 111 and an upper surface holding part 112.

The electric wire holding device 2 slides between the lower surface holding part 111 and the upper surface holding part 112 to be mounted. On a lower surface 2u, formed is a triangle reverse stopper part 27 widening from the back side toward the front side. The reverse stopper part 27 is pushed by the lower surface holding part 111 to be deformed when the electric wire holding device 2 is inserted into the mounting part 11. When the electric wire holding device 2 is completely inserted, the reverse stopper part 27 is fitted into an engaging hole 12 formed in the lower surface holding part 111 to be engaged with the engaging hole 12, so that the electric wire holding device 2 is prevented from sliding toward the front side.

The electric wire insertion hole 23 is a through hole which makes it possible for the power supply cord 3 to be inserted from the outside to the inside of the case 21 with no stress there on. The electric wire exit hole 24 is also a through hole which eliminates the stress on the power supply cord 3, same as the electric wire insertion hole 23.

As shown in FIG. 2, the holding shaft 26 comprises a first holding shaft 261 provided on the front side, a second holding shaft 262 provided on the back side and a third holding shaft 263 provided between the first holding shaft 261 and the second holding shaft 262. The first, second and third holding shafts 261, 262 and 263 are erected from a bottom surface 211 of the case 21 (refer to FIG. 3). The first and second holding shafts 261 and 262 are arranged so that a line segment between the centers of the first and second holding shafts 261 and 262 would be parallel to a direction of the slide of the electric wire holding device 2. The third holding shaft 263 is formed in a part closer to the electric wire exit hole 24 than the line segment connecting the centers of the first and second holding shafts 261 and 262.

The power supply cord 3 is provided between the first and third holding shafts 261, 263 and between the second and third holding shafts 262, 263 so as to be in contact with them. On the outer circumferential surfaces of the first, second and third holding shafts 261, 262 and 263, formed are anti-slip members for preventing the power supply cord 3 from slipping. Here, considered as the anti-slip member can be grooves formed on the outer circumferential surface. The anti-slip member, however, is not limited to the above. Any member may be widely used so long as the power supply cord 3 and the respective holding shafts 261, 262 and 263 can be prevented from slipping and any special work or member is not required.

As shown in FIG. 2, the fold-back part 25 is in the shape of a triangular prism having a curved surface part 251 formed on the back side. The curved surface part 251 is in the shape capable of folding back the power supply cord 3 with no unnecessary stress on the power supply cord 3. The front side end of the first holding shaft 261 is formed substantially same as the curved surface part 251 or closer to the front side than the curved surface part 251. The power supply cord 3 folded back at the curved surface part 251 is wounded from the front side of the first holding shaft 261 to extend from the side opposite to the electric insertion hole 23 (the right side in FIG. 2) to the back side. The power supply cord 3 then extends straight to the back side to be wound from the side opposite to the electric wire insertion hole 23 (the right side in FIG. 2) to the back side of the second holding shaft 262, and then, extends to the front side. The power supply cord 3 extending from the second holding shaft 262 to the front side is arranged to be wound from a side on which the first holding shaft 261 and the second holding shafts 262 are provided (the right side in FIG. 2) to the front side of the third holding shaft 263, be folded back and exited from the electric wire exit hole 24.

As described above, winding the power supply cord 3 around the three holding shafts 261, 262 and 263 allows friction force to operate between the respective holding shafts 261, 262 and 263 and the power supply cord 3. Accordingly, even when the power supply cord 3 is pulled toward the electric wire insertion hole 23 and (or) toward the electric wire exit hole 24, the electric wire on the other side is not pulled. This allows the force of tension not to be added to a member connected to the power supply cord 3 when the power supply cord 3 is pulled from the outside, so that the power supply cord 3 can be prevented from inconveniently falling off or coming out.

Figure 4:
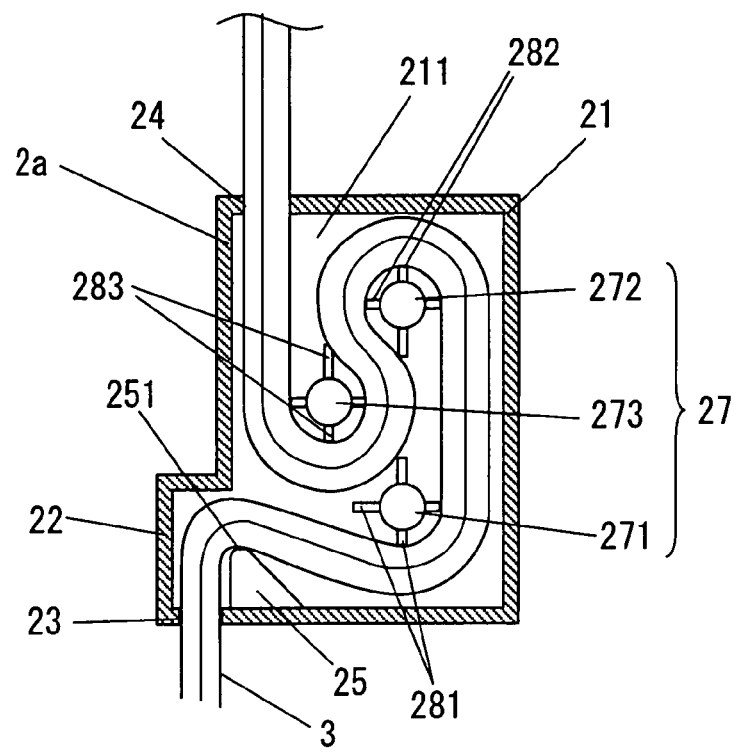
FIG. 4 is a flat sectional view of another example of an electric wire holding device in accordance with the invention.
Figure 5:
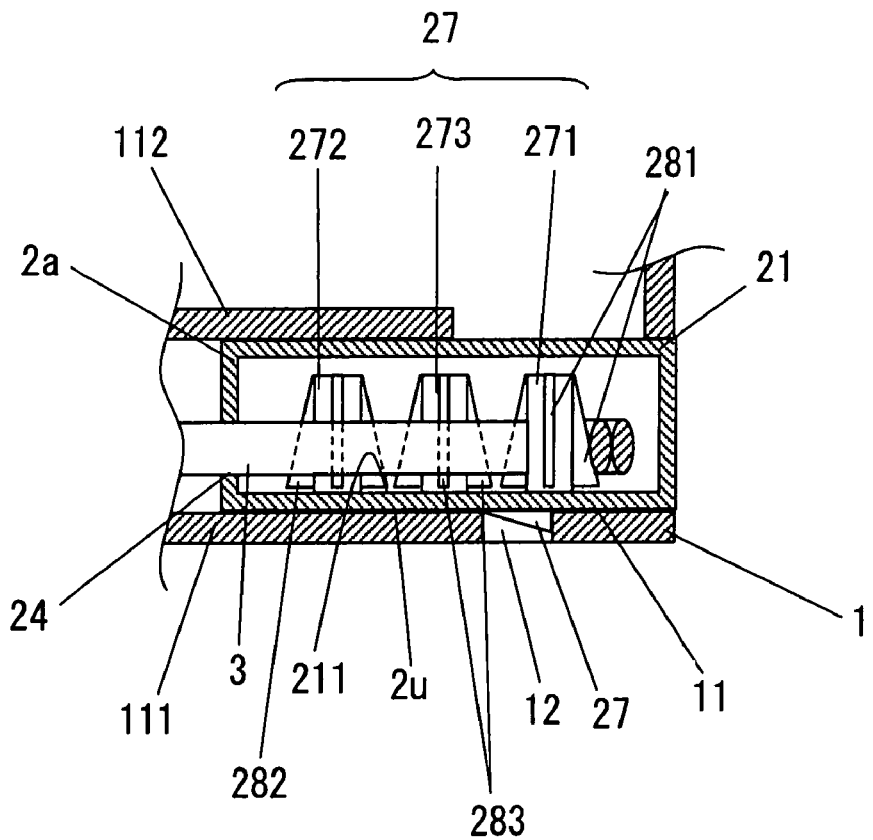
FIG. 5 is a side sectional view of the electric wire holding device shown in FIG. 4.
Figure 6:
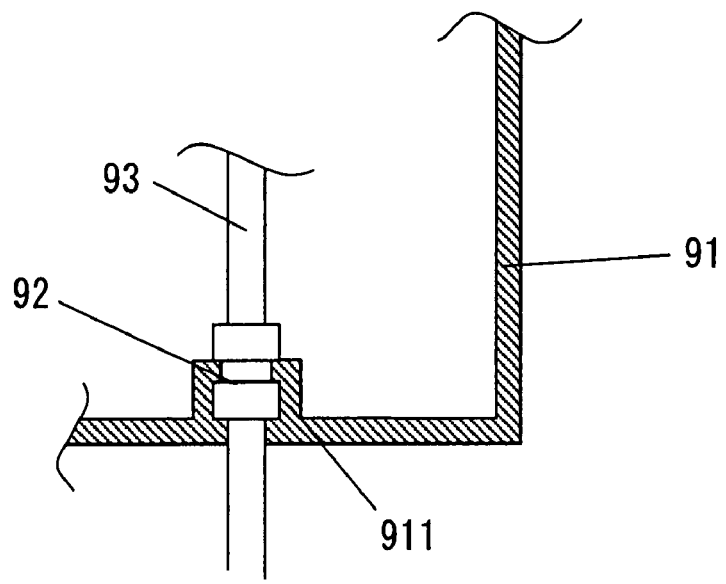
FIG. 6 is a conventional fixing structure of a power supply cord of an electronic device.

FIG. 4 is a flat sectional view of another example of an electric wire holding device in accordance with the invention. FIG. 5 is a side sectional view of the electric wire holding device shown in FIG. 4. An electric wire holding device 2a shown in FIGS. 4 and 5 has the same structure as the power supply holding member 2 shown in FIGS. 2 and 3 other than tree holding shafts 271, 272 and 273. The substantially same parts are marked with the same reference signs and numerals.

As shown in FIGS. 4 and 5, triangle ribs 281, 282 and 283, which are formed so as to extend from an upper part to a lower part, are formed in the first, second and third holding shafts 271, 272 and 273. For the sake of convenience, described here will be the first holding shaft 271. The second holding shafts 272 and the third holding shaft 273, however, also have the shape same as the above.

As shown in FIG. 4, the triangle rib 281 is erected integrally from the outer circumferential surface of the first holding shaft 271 in the axial direction. The triangle ribs 281 are provided four in number and arranged so as to form an equal center angle (90 degrees) with adjacent triangle ribs 281, respectively.

In the electric wire holding device 2a shown in FIGS. 4 and 5, the power supply cord is wounded so as to be in contact with the triangle ribs 281, 282 and 283 of the respective holding shafts 271, 272 and 273. The form of winding is same as the case of the electric wire holding device 2 shown in FIG. 2. Forming the triangle ribs 281, 282 and 283 causes a change of the diameter from the center of each of the holding shafts 271, 272 and 273 in the axial direction. Accordingly, a common electric wire holding device can be used even in the case that power supply cords with a margin of error in manufacturing or different in specification are used.

In the respective embodiments, described has been a case that the electronic device is a television receiver. The invention, however, is not limited to the above. Moreover, the power supply cord 3 has been described as an example of the electric wire, but the invention is not limited to the above. The invention is widely applicable to an electric wire such as an electric wire for a signal.

The embodiments of the invention have been concretely described above. The invention, however, is not limited to the embodiments and can be variously modified within a range not deviated from the spirit of the invention. The invention may include plural characteristics among the characteristics described in the respective embodiments.

What is claimed is:

1. An electric wire holding device mounted to a cabinet of an electronic device for holding an electric wire, comprising:
    a case detachable to the cabinet;
    an electric wire insertion hole formed at an end of a front of the case for inserting the electric wire;
    an electric wire exit hole formed on a back side of the case for letting the electric wire exit;
    an electric wire fold-back part provided adjacently to the electric wire insertion hole for folding back the electric wire to the front side;
    a first holding shaft provided on the front side of the case;
    a second holding shaft provided on the back side of the case;
    a third holding shaft formed substantially at the middle of the first holding shaft and the second holding shaft and provided at a place closer to the electric wire exit hole than a line connecting the first holding shaft and the second holding shaft; and
    an inverse stopper part formed on a lower surface of the case so as to widen from the back side to the front side,
    the electric wire holding device characterized in that
    the electric wire is wounded so as to be folded back at the fold-back part of the electric wire, contacted with the front side of the first holding shaft, contacted with the back side of the second holding shaft to be folded back, contacted with the front side from a side opposite to the electric wire exit hole of the third holding part and exited from the electric wire exit hole.

2. The electric wire holding device according to claim 1, wherein the electric wire is a power supply cord.

3. The electric wire holding device according to claim 1, wherein
    at least one of the holding shafts has a column shape and includes plural triangle ribs projectingly provided at equal center angle intervals on the outer circumferential part and widening from an upper part to a lower part.

4. The electric wire holding device according to claim 2 wherein
    at least one of the holding shafts has a column shape and includes plural triangle ribs projectingly provided at equal center angle intervals on the outer circumferential part and widening from an upper part to a lower part.

5. The electric wire holding device according to claim 3 wherein
    the triangle ribs are provided four in number at an equal center angle interval on the outer circumferential part of the holding shaft.

6. The electric wire holding device according to claim 4 wherein
    the triangle ribs are provided four in number at an equal center angle interval on the outer circumferential part of the holding shaft.

7. A television receiver including a holding device mounted to a cabinet for holding a power supply cord, the television receiver comprising:
    a case detachable to the cabinet and in the shape of a rectangular parallelepiped;
    a cord insertion hole having a protrusion formed at an end on a front surface side of a side of the case for inserting the power supply cord from a front surface of the protrusion;
    a cord exit hole formed on an end on the same side as the cord insertion hole in a back surface of the case for letting the power supply cord exit;

a cord fold-back part provided adjacently to the cord insertion hole for folding back the power supply cord to the front side; and three holding shafts for winding the power supply cords therearound, the television receiver characterized in that an inverse stopper part formed so as to widen from the back side to the front side is provided in a lower surface of the case;

the three holding shafts include: a first holding shaft provided on a front side of the case; a second holding shaft provided on a back side of the case; and a third holding shaft formed substantially at the middle of the first holding shaft and the second holding shaft and provided at a place closer to the cord exit hole than a line connecting the first holding shaft and the second holding shaft, each of the holding shafts including a column part projectingly provided on a bottom surface of the case and four triangle ribs projected at equal center angles from the outer circumference of the column part to widen from an upper part to a lower part, the power supply cord is wounded so as to be folded back at the cord fold-back part, contacted with the front side of the first holding shaft, contacted with the back side of the second holding shaft to be folded back, contacted with the front side from a side opposite to the cord exit hole of the third holding part and exited from the cord exit hole, and the two holding shafts of the first and third holding shaft and the second and third holding shafts are provided so that the power supply cord is in contact with the triangle ribs of the respective holding shafts.

* * * * *